No Printed Specification Available
8279X
J. Chase,
Washing Machine,
Patented June 23, 1834
Fig; 1.
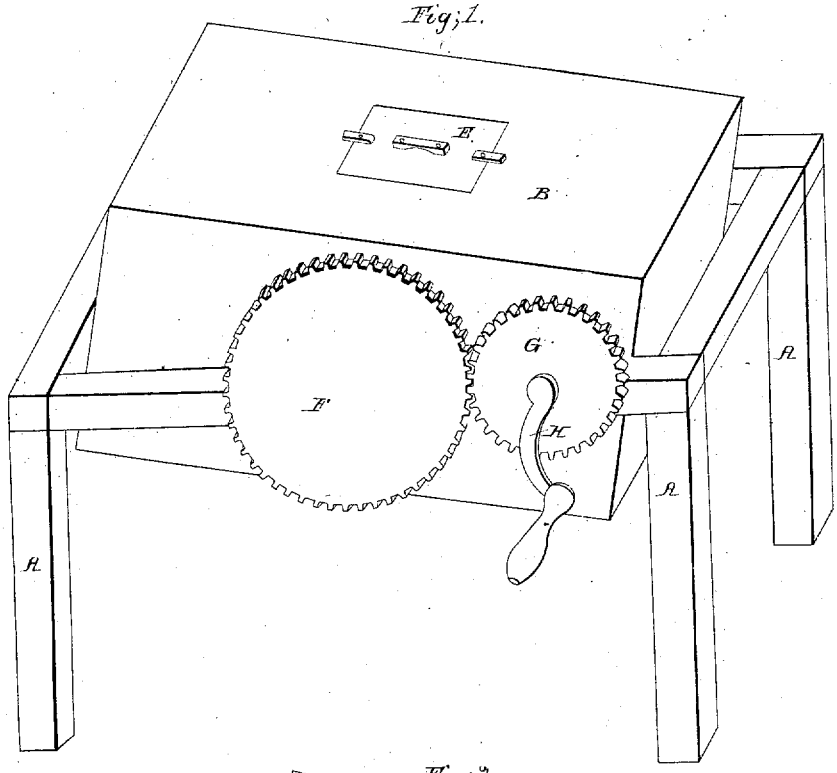
Fig; 2.
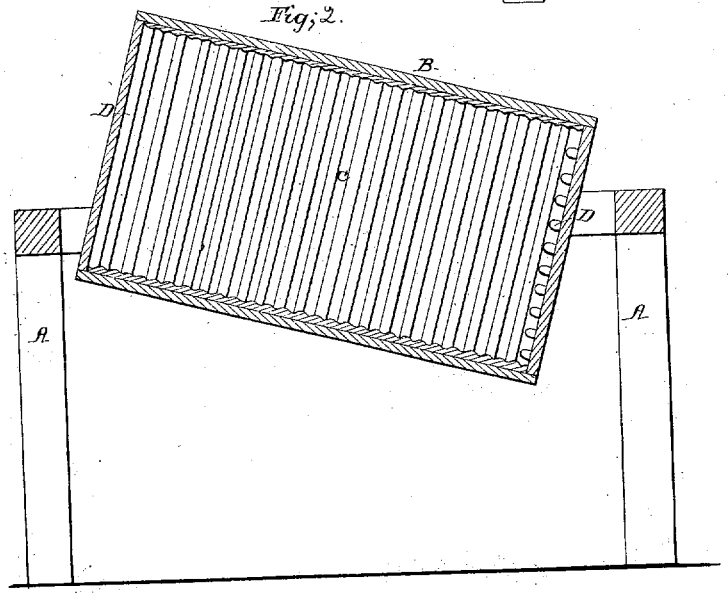
A. PETERS, PHOTO-LITHOGRAPHER, WASHINGTON, D. C.

8279X June 23. 1834 461

Jotham Chase of Waterborough Maine
Letters Patent.

The Schedule referred to in these Letters Patent and making part of the same containing a description in the words of the said Jotham Chase himself of his improvement in the washing machine To all to whom these Presents shall come Be it Known that I Jotham Chase of Waterborough in the County of York and State of Maine have invented a new and useful improvement in the Washing Machine and that the following is a full and exact description of the construction and operation of the said machine as invented or improved by me. viz.. first by taking four pieces of Board one inch thick and forming a square Box three feet long eighteen wide, and fourteen inches deep halved together and well nailed. Said Box to be lined on the inside with fluted board three fourths of an inch thick. mitred at the corners of the box the grain of the wood running crossways with that of the outside. there is then put in two ends made of one inch boards halved in to fit. on the inside of these ends are then placed rails or cross bars in the following manner viz! by taking hard wood board [three fourths of an inch thick, one & a half inch wide, and] long enough to reach across the box and halve into the same. the edges to be rounded off placed one and a half inch apart. at one end horizontally. and at the other end perpendicularly at the same distance from each other.

Two gudgeons are then affixed to the centre of the box, one on each side. on one of which is attached a cog wheel of cast iron about one foot in diameter. another wheel with one half the number of cogs made to match into the former. is secured to the frame by a bolster. bolt and screw. an iron crank ten inches long with a wooden handle is attached to the small wheel to put the machine into operation.

A frame is then made by taking two pieces of hard wood. joist each four feet long and three inches square and confining them one to the other at each end nineteen inches apart on the inside with pieces two inches square. the frame is then set on four legs two inches square and two feet long. The machine is then placed on the centre of the frame & turned by the crank as above described. The clothes to be washed are then put into the machine. with a suitable quantity of soap suds at a door cut out of the centre of the top of the machine ten inches square. halved on the inside & having a handle is then put onto the machine brought up to its place and secured by buttons The machine now put in operation by turning the crank will change the clothes from one end of the box to the other every revolution of the crank and the wheels are so put together that when the handle of the crank is nearest the operator the
bar will be in a perpendicular direction. By this method the clothes are kept warm
being confined from the air, are constantly changed from one end to the other striking
with sufficient force on the fluteys and rails, or cross bars, to cleanse them thoroughly
in less time and with much less labour, than any other machine that I have exam-
ined — Coverlets, Quilts or woollen garments with buttons on them may be
washed clean in a few minutes without sustaining any injury, and with equal
facility of those of cotton or linen. I claim as my improvement the general form
and operation of the machine with the rails or cross bars as above described, and
the particular operation of the crank and cog wheels. well satisfied by actual exper-
iments that it possesses many advantages over any other machine in operation. and
that its simplicity and cheapness and power of cleaning will make it a valuable
improvement Exd. Witnesses
W.G.C. Richard W Clarke
Robt. Clarke Jotham Chase Drawing (660 words)